US008238617B2

(12) United States Patent
Omoto et al.

(10) Patent No.: US 8,238,617 B2
(45) Date of Patent: Aug. 7, 2012

(54) VEHICLE OPERATION CONTROL DEVICE AND METHOD, AS WELL AS, PROGRAM

(75) Inventors: Yasumichi Omoto, Kasugai (JP); Shunji Ota, Kasugai (JP); Hiroyoshi Koitabashi, Nagoya (JP); Takeshi Shoji, Nara (JP)

(73) Assignee: OMRON Corporation, Kyoto (JP)

( * ) Notice: Subject to any disclaimer, the term of this patent is extended or adjusted under 35 U.S.C. 154(b) by 384 days.

(21) Appl. No.: 12/713,925

(22) Filed: Feb. 26, 2010

(65) Prior Publication Data

US 2010/0232658 A1    Sep. 16, 2010

(30) Foreign Application Priority Data

Mar. 13, 2009    (JP) .................................. 2009-060624

(51) Int. Cl.
*G06K 9/00*    (2006.01)
(52) U.S. Cl. .............. 382/118; 382/115; 701/1; 701/36; 701/200; 701/201
(58) Field of Classification Search .................. None
See application file for complete search history.

(56) References Cited

U.S. PATENT DOCUMENTS

| 6,198,996 | B1 * | 3/2001 | Berstis ........................... 701/36 |
| 6,917,801 | B2 * | 7/2005 | Witte et al. .................... 455/418 |
| 2007/0159309 | A1 * | 7/2007 | Ito et al. ....................... 340/425.5 |
| 2009/0148006 | A1 * | 6/2009 | Hayasaki ........................ 382/118 |
| 2010/0036560 | A1 * | 2/2010 | Wright et al. .................... 701/36 |

FOREIGN PATENT DOCUMENTS

| JP | 2001-014575 | A | 1/2001 |
| JP | 2001-060095 | A | 3/2001 |
| JP | 2001-182812 | A | 7/2001 |
| JP | 2002-203244 | A | 7/2002 |
| JP | 2003-214241 | A | 7/2003 |
| JP | 2006-259828 | A | 9/2006 |
| JP | 2006-327346 | A | 12/2006 |
| JP | 2006-350566 | A | 12/2006 |
| JP | 2007-186144 | A | 7/2007 |
| JP | 2007-308069 | A | 11/2007 |

* cited by examiner

*Primary Examiner* — Jason M Repko
*Assistant Examiner* — David Perlman
(74) *Attorney, Agent, or Firm* — Osha Liang LLP

(57) ABSTRACT

A similarity degree calculating unit calculates a similarity degree of a feature quantity of a face image of an imaged checking target, and a feature quantity of a face image of a registrant or a non-registrant registered in a registrant information DB or a non-registrant information DB. A check determination unit notifies a service determination unit when the similarity degree is higher than a threshold value. A related information acquiring unit acquires related information including inter-registrant information, and provides to a time-series information DB generation unit and the service determination unit. The time-series information DB generation unit updates the time-series information DB. A statistical information DB generation unit generates the statistical information DB from the time-series information DB. The service determination unit provides services based on the related information, the time-series information DB, and the statistical information DB.

6 Claims, 8 Drawing Sheets

FIG. 4

NON-REGISTRANT A

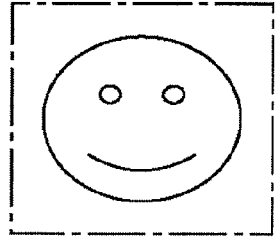

- TRAVEL DISTANCE 1km, ONCE
- TRAVEL HOME → CONVENIENCE STORE, ONCE
- OPEN/CLOSE OF DOOR OF PASSENGER SEAT, ONCE

NON-REGISTRANT B

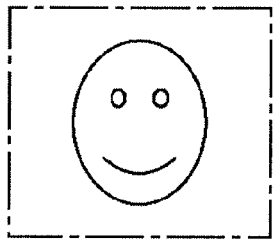

- ON VEHICLE AT POINT C, ONCE
- ON VEHICLE AT POINT B, ONCE
- ON VEHICLE AFTER REGISTRANT, TWICE
- ON VEHICLE BETWEEN REGISTRANTS, ONCE
- AVERAGE TRAVEL DISTANCE: 1.5km
- PASSENGER: REGISTRANT $\beta$, ONCE

NON-REGISTRANT C

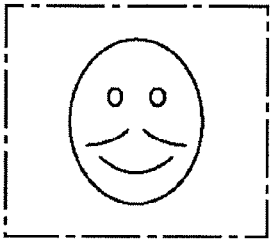

- ON VEHICLE AT POINT C, ONCE
- ON VEHICLE BETWEEN REGISTRANTS, ONCE
- AVERAGE TRAVEL DISTANCE: 1.5km
- PASSENGER: REGISTRANT $\beta$, ONCE

VEHICLE OPERATION CONTROL DEVICE AND METHOD, AS WELL AS, PROGRAM

BACKGROUND OF THE INVENTION

1. Technical Field

The present invention relates to vehicle operation control devices and methods, as well as programs, and in particular, to a vehicle operation control device and method, as well as a program enabling the operation of a vehicle to be appropriately controlled, even with respect to an unregistered driver who has not performed a specific registration process, according to each unregistered driver.

2. Related Art

A technique of individually specifying a driver through a recognition process using a face image has been conventionally proposed (see Japanese Unexamined Patent Publication No. 2007-186144, Japanese Unexamined Patent Publication No. 2003-214241).

Furthermore, through the use of the above technique, a technique of specifying a driver by comparing information obtained from the face image imaged with cameras installed at the interior and the exterior of the vehicle, and external information that specifies an individual such as personal information and a drivers license registered in correspondence with the face image registered in a database in advance, and providing an optimum service for each specified individual has been proposed (see Japanese Unexamined Patent Publication No. 2001-060095, Japanese Unexamined Patent Publication No. 2001-182812, and Japanese Unexamined Patent Publication No. 2007-308069).

In the techniques described above, some kind of comparison reference is registered in the database for every specific person or a card containing personal information such as a drivers license is read with a card reader and the like with respect to the person to compare (see Japanese Unexamined Patent Publication No. 2002-203244), and whether the compared person is a legitimate driver is determined depending on whether or not the information match the reference information.

According to the above-described technique, determination is made as "illegitimate" to the person whose information does not match the reference information, and a technique of urging new registration or limiting an automobile operation with respect to the person determined as "illegitimate" is proposed (see Japanese Unexamined Patent Publication No. 2006-350566, Japanese Unexamined Patent Publication No. 2006-327346).

Furthermore, a method of notifying the legitimate registrant that the person determined as "illegitimate" is at the interior or the exterior of the automobile (see Japanese Unexamined Patent Publication No. 2001-014575, Japanese Unexamined Patent Publication No. 2006-259828). A method of registering the "illegitimate person", and determining as "illegitimate" only when a specific person is identified is also proposed.

SUMMARY

However, if an excessive regulation is imposed on the automobile operation only because the determination is "illegitimate" due to non-registration, it is often inappropriate to impose limitations on the automobile operation for families and friends close to the registered driver.

In replacement driving or temporary riding due to change of driver and the like, it is cumbersome to make the registration every time, and it is inconvenient when desiring to allow legitimate operation without registration.

Conventionally, individual service can be provided to a plurality of registrants, but only uniform response can be made with respect to non-registrants.

One of more embodiments of the present invention realize an optimum response individually even with respect to non-registrants in the recognition process of the passenger of the automobile.

BRIEF DESCRIPTION OF THE DRAWINGS

FIG. 4 is a view describing a statistical information database;

DETAILED DESCRIPTION

Figure 1:
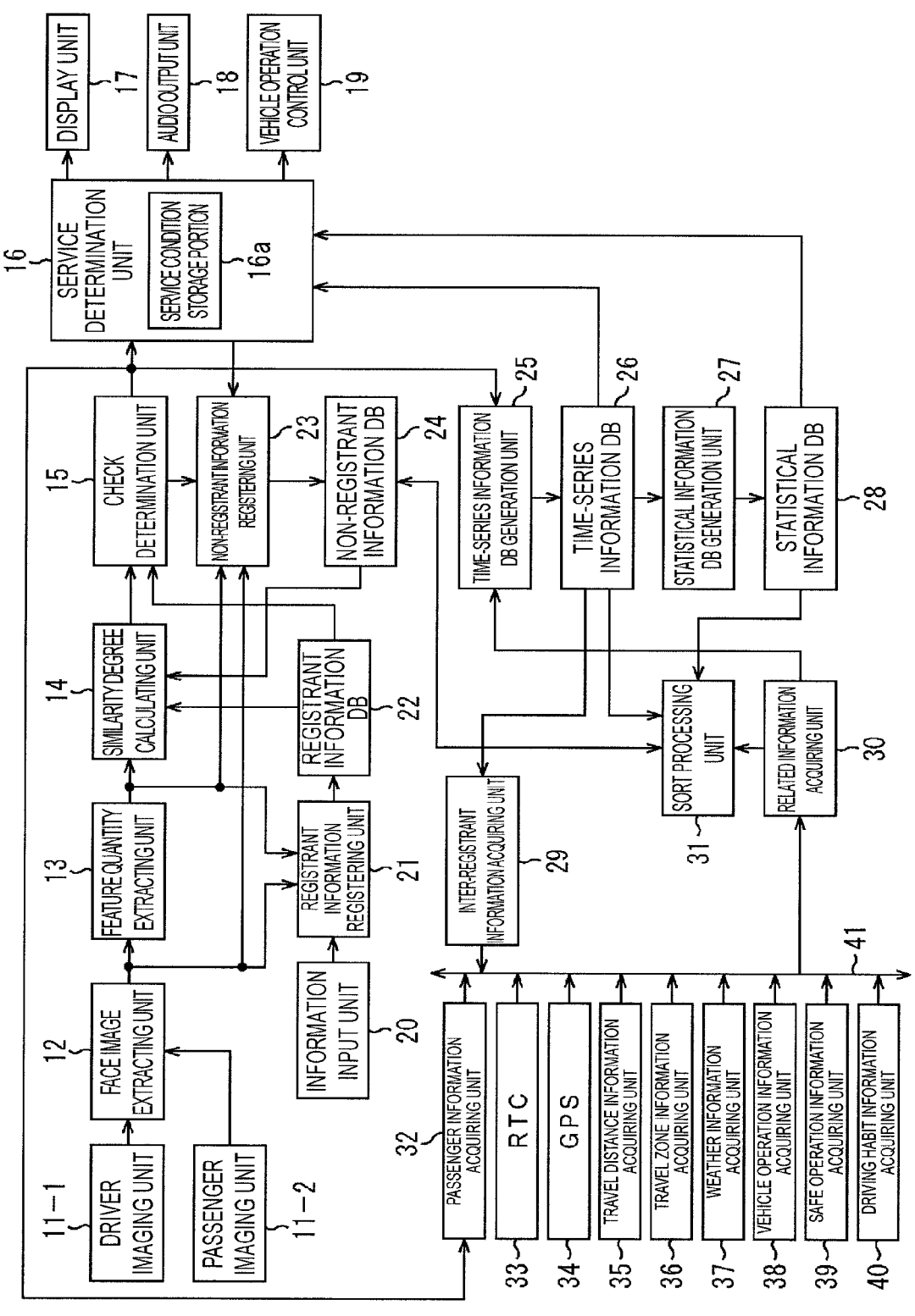
FIG. 1 is a view describing a configuration example of a vehicle operation control device applying the present invention.

Configuration Example of One Embodiment of Vehicle Operation Control Device According to the Present Invention FIG. 1 is a view showing a configuration example of one embodiment of a vehicle operation control device according to the present invention.

The vehicle operation control device of FIG. 1 actually configures the vehicle itself, and extracts a face image of a driver and a passenger from an image imaged with an imaging device such as a camera, checks if the driver is a registrant or a non-registrant based on the extracted face image, adjusts a reclining and the height of a driver seat, and a telescopic steering and the like to the registered position in correspondence with the registrant if the driver is a registrant, and controls the operation of the vehicle so that the engine can be started. If the driver is a non-registrant based on the face image, the vehicle operation control device of FIG. 1 omits the adjustment of the driver seat but controls the vehicle so that the engine can be started when recognizing that the non-registrant is a person pursuant to the registrant such as the family of the registrant and also controls the vehicle so that the engine cannot be started when the non-registrant is not even a person close to the registrant. In other words, the vehicle operation control device of FIG. 1 provides an optimum service to the driver through face authentication.

The configuration of the vehicle operation control device of FIG. 1 will now be described in detail.

A driver imaging unit 11-1 and a passenger imaging unit 11-2 are both configured by an imaging element such as a CCD (Charge Coupled Devices) or a CMOS (Complementary Metal Oxide Semiconductor), and respectively images the driver at the driver seat and the passenger at the passenger seat, the back seat, and the like, and provides the imaged image to a face image extracting unit 12. The driver imaging unit 11-1 and the passenger imaging unit 11-2 do not need to be individually arranged, and may be only one as long as everyone can be imaged with one imaging unit including the driver seat. In a vehicle adopting a three-row seat such as a so-called minivan, the imaging unit may be arranged for every row so that more images can be imaged.

The face image extracting unit 12 specifies the position of the face image by facial contour and parts such as eyes, nose, ears, and mouse from the image provided from the driver imaging unit 11-1 and the passenger imaging unit 11-2, extracts the image of a specified region as the face image, and provides the information of the extracted face image to a feature quantity extracting unit 13, a registrant information registering unit 21, and a non-registrant information registering unit 23.

The feature quantity extracting unit 13 extracts the distance between the central positions of the left and right eyes, the distance between the left and right eyes and the nose, the contour shape, and the like as the feature quantity from the face image provided from the face image extracting unit 12, and provides the feature quantity to a similarity degree calculating unit 14, the registrant information registering unit 21, and the non-registrant information registering unit 23.

An information input unit 20 inputs registering information of the registrant, and has functions of inputting or reading the preferred seat position of the registrant, the reclining angle, the expansion and contraction position of the telescopic steering, and the like in addition to the key board and the operation button for inputting text information including personal information such as name, age, sex, and blood type of the registrant, and provides the information to the registrant information registering unit 21 when accepting the input of such information.

The registrant information registering unit 21 registers, as a registrant information database 22 (hereinafter also referred to as registrant information DB 22), the various types of information on the registrant provided from the information input unit 20, the face image of the registrant provided from the face image extracting unit 12, and the information of the feature quantity of the face image provided from the feature quantity extracting unit 13, in correspondence with the face image.

In the following, description will be made assuming that the face image and the feature quantity are respectively managed, but only the face image may be stored and the feature quantity may be obtained from the stored face image, as necessary, since the feature quantity necessary for checking can be obtained from the face image.

The similarity degree calculating unit 14 calculates the similarity degree using the feature quantity provided from the feature quantity extracting unit 13, and the feature quantity in the registrant information DB 22 or of the non-registrant registered in a non-registrant information database 24 (hereinafter referred to as non-registrant information DB 24), and provides the calculated similarity degree to a check determination unit 15. The similarity degree calculating unit 14 sequentially obtains the similarity degree in the order registered in the non-registrant information DB 24.

The check determination unit 15 compares the similarity degree provided from the similarity degree calculating unit 14 and a predetermined threshold value, assumes as a registrant if the similarity degree is higher than the predetermined threshold value, reads out the information on the corresponding registrant from the registrant information DB 22, and provides the information to a service determination unit 16, a passenger information acquiring unit 32, and a time-series information DB generation unit 25. If the similarity degree with the feature quantity of the registrant registered in the registrant information DB 22 is not higher than the predetermined threshold value, the check determination unit 15 instructs the non-registrant information registering unit 23 to register the face image and the feature quantity in the non-registrant information DB 24 as a non-registrant.

The non-registrant information registering unit 23 acquires the face image and the feature quantity, which are instructed to be registered to the non-registrant information DB 24, from the face image extracting unit 12 and the feature quantity extracting unit 13, respectively, and registers the information of the feature quantity in the non-registrant information DB 24 in correspondence with the face image.

The registrant and the non-registrant will be described below.

Figure 2:
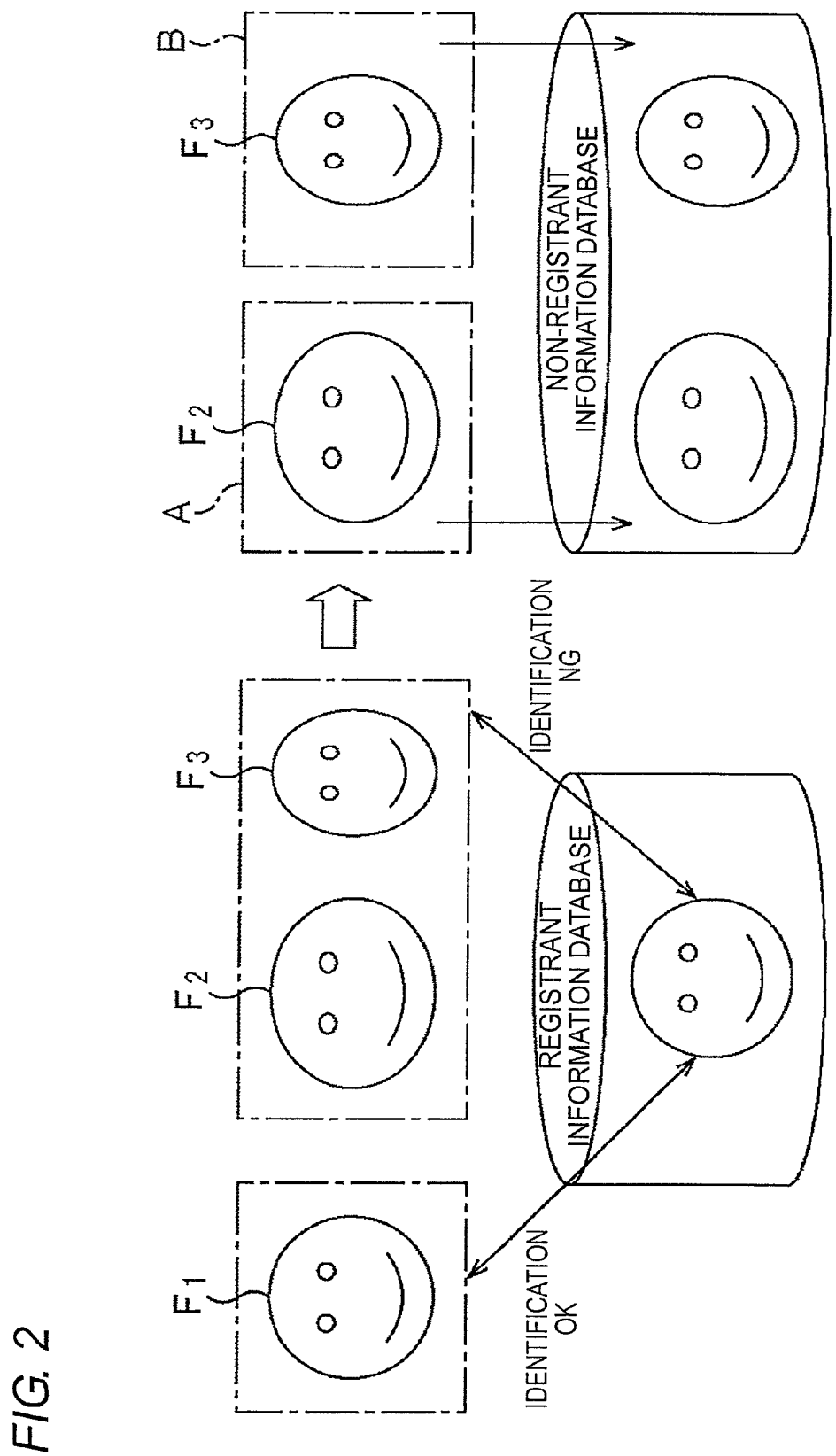
FIG. 2 is a view describing a registrant and a non-registrant.

A registrant is a person who registered the face image by his/her own will, and the registrant information contains the face image, the feature quantity of the face image, and the personal information. A non-registrant, on the other hand is a person who is not recognized as a registrant from the face images provided for authentication as the face image, and the non-registrant information DB 24 forms a database of the face images of the people not recognized as a registrant. In other words, as shown in FIG. 2, when the feature quantities of the face images F1 to F3 are extracted, and the similarity degree is calculated using the feature quantity of the face image of the registrant registered in the registrant information DB 22, the similarity degree is higher than the predetermined threshold value for the face image F1 and thus such a face image is recognized as a registrant. However, the similarity degree is not higher than the predetermined threshold value for the face images F2, F3 and thus such face images are determined as non-registrants. In such a case, the face images F2, F3 are registered in the non-registrant information DB 24 as non-registrants A, B. Actually, the non-registrant information DB 24 is registered with the face image and the feature quantity of the non-registrant in correspondence each other.

The description will return to FIG. 1.

An inter-registrant information acquiring unit 29 acquires the time-series anteroposterior relationship with the registrant based on the information of a time-series information DB 26, to be described later, when the driver is determined as a non-registrant A. The time-series information DB 26 is recorded with time-series related information of the registrant and the non-registrant, where the inter-registrant information acquiring unit 29 acquires the related information indicating the time-series anteroposterior relationship that the non-registrant A used the vehicle at the timing after the registrant S drove the vehicle, and provides the same to a related information acquiring unit 30 through a bus 41.

The passenger information acquiring unit 32 acquires the passenger information of the vehicle at the timing the driver is imaged based on the check result of the face images extracted from the image imaged by the passenger imaging unit 11-2, and provides the same to the related information acquiring unit 30 through the bus 41. In other words, the passenger information acquiring unit 32 acquires information of registrant T and non-registrant B as passengers, and provides the same to the related information acquiring unit 30. An RTC (Real Time Clock) 33 generates current time information, and provides the same to the related information acquiring unit 30 as related information. A GPS (Global Positioning System) 34 acquires signals from the satellite (not shown), obtains the position on earth including latitude and longitude, and provides the same to the related information acquiring unit 30 through the bus 41 as related information including positional information.

A travel distance information acquiring unit 35 acquires the travel distance from a travel distance measurement device (not shown), and provides the same to the related information acquiring unit 30 through the bus 41 as the related information. A travel zone information acquiring unit 36 obtains a position, which is a base point of traveling, and a position, which is an end point of traveling, (position where recognized driver got off the vehicle, etc.) from the map information with a navigation device and the like (not shown), and provides the same to the related information acquiring unit 30 through the bus 41 as related information. A weather information acquiring unit 37 includes a temperature sensor, a humidity sensor, a raindrop sensing sensor, and the like, and detects weather information such as outside air temperature, outside humidity, precipitation, snowfall, and the like as related information, and provides the same to the related information acquiring unit 30 through the bus 41.

A vehicle operation information acquiring unit 38 acquires, as the operation state of the vehicle, vehicle operation information or the operation state of various types of devices accessory to the vehicle such as the engine is turned ON, the front door is opened, the front headlight is lighted ON, the air conditioner is turned ON or OFF, and the set temperature, as well as, the setting of the destination of the navigation device, and the like as the related information, and provides the same to the related information acquiring unit 30 through the bus 41. A safe operation information acquiring unit 39 acquires, as operation related to safety of the vehicle, safe operation information related to safety such as sudden braking, abrupt steering, contact, deployment of airbag, and the like as related information, and provides the same to the related information acquiring unit 30 through the bus 41. A driving habit information acquiring unit 40 acquires driving habit information, or the habit of driving, such as timing of shift change, rate of change in depressing the accelerator, the distance until stop from when starting braking, and the like at the time of driving of the driver who drives the vehicle as the related information, and provides the same to the related information acquiring unit 30 through the bus 41.

The related information acquiring unit 30 acquires the inter-registrant information, the passenger information, the time information, the positional information, the travel distance information, the travel zone information, the weather information, the vehicle operation information, the safe information, and the driving habit information, and provides the same to the service determination unit 16, the time-series information DB generation unit 25, and a sort processing unit 31. The time-series information DB generation unit 25 generates a time-series information DB 26 or a database in which the related information is registered in time-series in correspondence with the face image that becomes the check result and updates the same, using the related information provided from the related information acquiring unit 30 and the check result provided from the check determination unit 15. The related information is not limited to the inter-registrant information, the passenger information, the time information, the positional information, the travel distance information, the travel zone information, the weather information, the vehicle operation information, the safe information, and the driving habit information, and may contain facial attribute information including age, sex, race, accessories such as eyeglass, makeup, and cigarette that can be estimated from the face image, which may all be used or some of them may be used.

[Time-Series Information Database]

Figure 3:
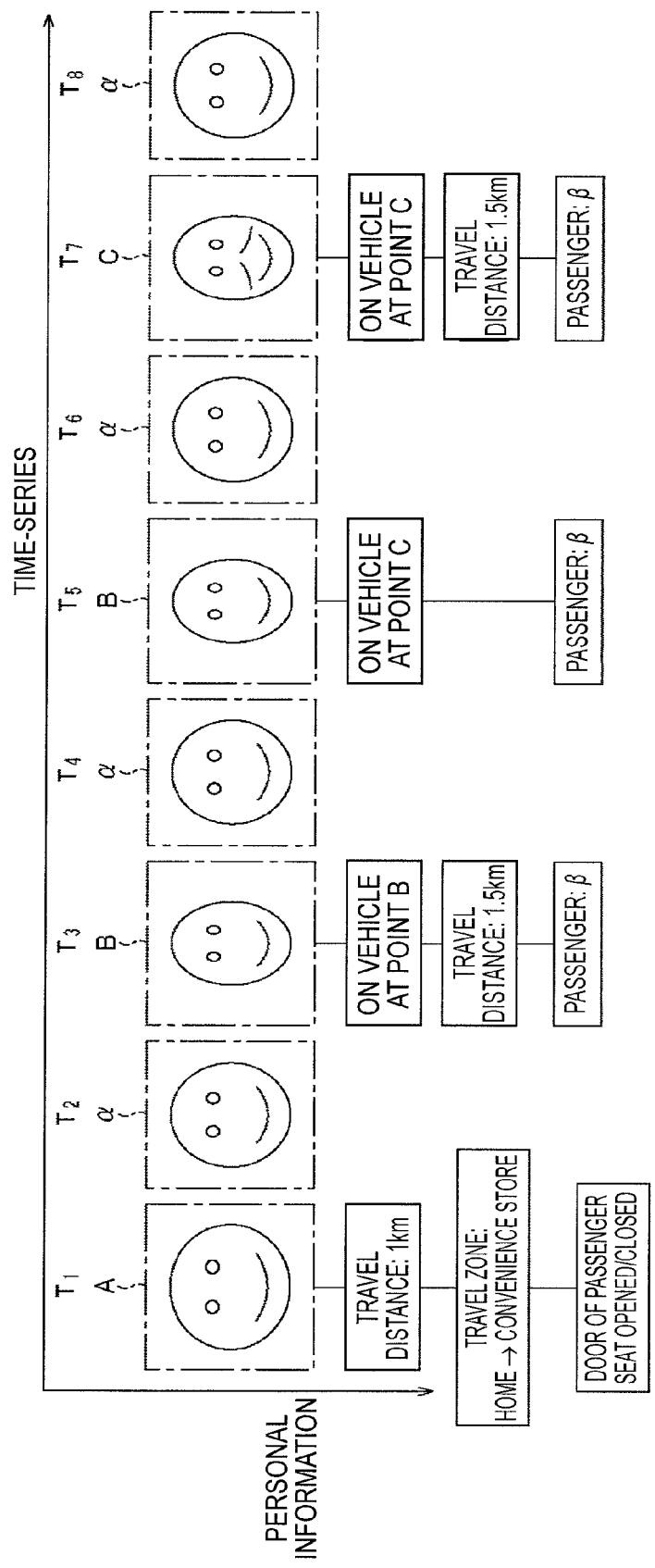
FIG. 3 is a view describing a time-series information database.

The time-series information DB 26 is as shown in FIG. 3. In FIG. 3, the face images are arranged at the respective timing with the horizontal axis as the time-series (time axis), and the vertical axis as the related information associated with the face image. In FIG. 3, the non-registrant A is recognized at the first timing of time T1, where the travel distance acquired by the travel distance information acquiring unit 35 is 1 km, the travel zone acquired by the travel zone information acquiring unit 36 is from home to a convenience store, and the opening/closing of the door at the passenger seat acquired by the vehicle operation information acquiring unit 38 are registered as the related information of the non-registrant A.

The registrant α is recognized at the timing of time T2.

The non-registrant B is recognized at the timing of time T3, where the passenger gets on the vehicle is at point B acquired by the GPS 34, the travel distance acquired by the travel distance information acquiring unit 35 is 1.5 km, and the passenger is the registrant β acquired by the passenger information acquiring unit 32 are registered as the related information of the non-registrant B.

The registrant α is recognized at the timing of time T4.

The non-registrant B is recognized at the timing of time T5, where the passenger gets on the vehicle is at point C acquired by the GPS 34, and the passenger is the registrant β acquired by the passenger information acquiring unit 32 are registered as the related information of the non-registrant B.

The registrant α is recognized at the timing of time T6.

The non-registrant C is recognized at the timing of time T7, where the passenger gets on the vehicle is at point C acquired by the GPS 34, the travel distance acquired by the travel distance information acquiring unit 35 is 1.5 km, and the passenger is the registrant β acquired by the passenger information acquiring unit 32 are registered as the related information of the non-registrant C.

The registrant α is recognized at the timing of time T8.

Therefore, in the time-series information DB 26, the recognized registrants and the non-registrants are arranged in time-series, and the related information are added to the recognized non-registrants. As a result, the order the registrants and the non-registrants are recognized, and the related information when the respective driver drives the vehicle are registered.

A statistical information DB generation unit 27 statistically processes each information of the time-series information registered in the time-series information DB 26, generates a statistical information DB 28, and updates the same.

[Statistical Information Database]

The statistical information DB 28 is as shown in FIG. 4. In FIG. 4, the information of the time-series information DB 26 of FIG. 3 is statistically processed, and the statistical information of the non-registrant A is registered at the upper stage, where the related information of the travel distance information that the travel distance is 1 km is registered once, the related information of the travel zone information from home to convenience store is registered once, the related information of the vehicle operation information that the door of the passenger seat opened/closed is registered once, and the related information of the passenger information of driving at the timing before the registrant is registered once.

The statistical information of the non-registrant B is registered at the middle stage, where the related information of the positional information of getting on the vehicle at point C is registered once, the related information of the positional information of getting on the vehicle at point B is registered once, the related information of the inter-registrant information of getting on the vehicle after the registrant is registered twice, the related information of the inter-registrant information of getting on the vehicle between the registrants is registered once, the related information of the travel distance information that the average travel distance is 1.5 km is registered once, and the related information of the passenger information of riding with the registrant β is registered once.

The statistical information of the non-registrant C is registered at the lower stage, where the related information of the positional information of getting on the vehicle at point C is registered once, the related information of the inter-registrant information of getting on the vehicle after the registrant is registered once, the related information of the travel distance information that the average travel distance is 1.5 km is registered once, and the related information of the passenger information of riding with the registrant β is registered once.

In other words, the statistical information are configured with only the information at times T1, T7 in the time-series information shown in FIG. 3 for the non-registrants A, C, and the cumulative addition or average value is obtained for the related information at times T3, T5 for the non-registrant B to thereby configure the statistical information DB 28.

The description will return to the description of FIG. 1.

The sort processing unit 31 sorts the registering order of the non-registrants registered in the non-registrant information DB 24 based on the related information provided from the related information acquiring unit 30, the information of the time-series information DB 26, and the statistical information DB 28. In other words, if the check result is the non-registrant, the registering order of the non-registrant information registered in the non-registrant information DB 24 is sorted in the order the possibility the check result matches becomes high by the related information, the time-series information, and the statistical information upon performing the calculation process of the similarity degree by the feature quantity of the face image of the non-registrant, thereby reducing the load of the check process related to the specification of the non-registrant and enabling the non-registrant to be specified at high speed.

The service determination unit 16 is checked by the check determination unit 15 based on the time-series information DB 25, the statistical information DB 28, and the related information, the service content set for every service condition corresponding to the specified registrant or the non-registrant is read out from a service condition storage portion 16a, and a vehicle operation control unit 19 is controlled to realize the corresponding service. In this case, the service determination unit 16 provides the service by images by a display unit 17 including an LCD (Liquid Crystal Display) and an organic EL (Electro Luminescence), or provides the service by audio by an audio output unit 18, as necessary.

[Face Authentication Service Process]

Figure 5:
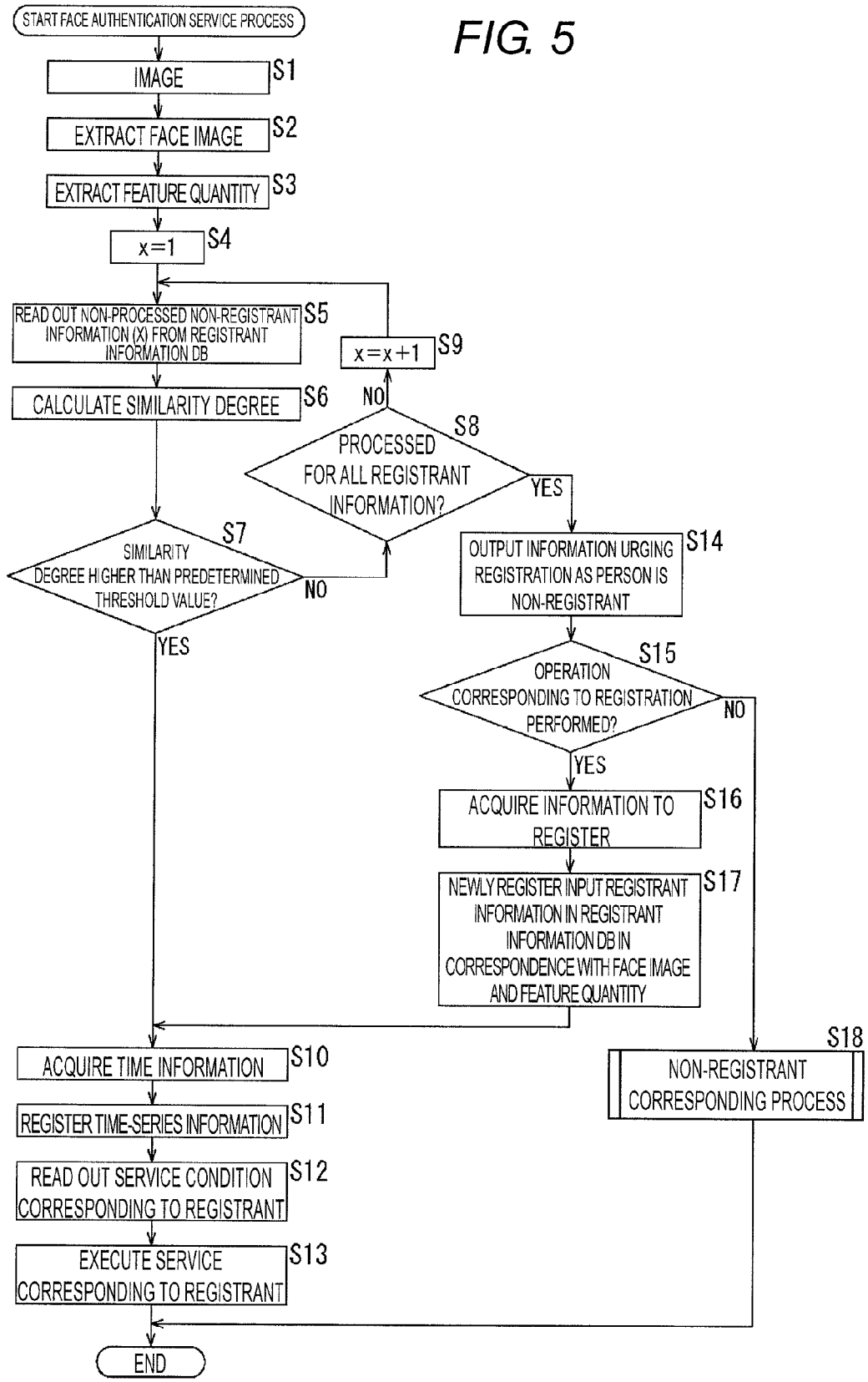
FIG. 5 is a flowchart describing a face authentication service process.

The face authentication service process will now be described with reference to the flowchart of FIG. 5.

In step S1, the driver imaging unit 11-1 (or passenger imaging unit 11-2) images an image, and provides the imaged image to the face image extracting unit 12. The image is added with the identification information for identifying the image imaged by the driver imaging unit 11-1 and the image imaged by the passenger imaging unit 11-2, and then provided to the face image extracting unit 12.

In step S2, the face image extracting unit 12 specifies the position of the face image from information such as the arrangement of parts such as eyes, mouth, nose, and ears, as well as, the contour from the image, cuts out the region of the specified face image to generate the face image, and provides the same to the feature quantity extracting unit 13, the registrant information registering unit 21, and the non-registrant information registering unit 23. The identification information is also added to each face image, so that whether the face image is of the driver or of the passenger can be subsequently identified.

In step S3, the feature quantity extracting unit 13 extracts the distance between the left and right eyes, the distance between the nose and the forehead, and the distance between the forehead and the chin from the face image provided from the face image extracting unit 12, and also extracts a feature quantity such as the ratio thereof, and provides to the similarity degree calculating unit 14, the registrant information registering unit 21, and the non-registrant information registering unit 23.

In step S4, the similarity degree calculating unit 14 initializes the counter x (not shown) to one.

In step S5, the similarity degree calculating unit 14 reads out the registrant information (x) from the registrant information DB 22. The registrant information (x) is the registrant information identified by the counter x indicating the individual registering order of the registrant information registered in the registrant information DB 22.

In step S6, the similarity degree calculating unit 14 calculates the similarity degree using the feature quantity of the registrant information (x) and the feature quantity of the face image provided from the feature quantity extracting unit 13, and provides the same to the check determination unit 15. The ratio, the difference, and the like of the feature quantities can be used for the similarity degree, and calculation is performed such that the similarity degree of the same person takes a high value.

In step S7, the check determination unit 15 determines whether or not the similarity degree with the feature quantity of the registrant information (x) is higher than a predetermined threshold value, where the process proceeds to step S8 if smaller than the predetermined threshold value, that is, determined as not similar.

In step S8, the similarity degree calculating unit 14 determines whether or not the similarity degree is calculated for all registrant information registered in the registrant information DB 22. If determined that the similarity degree is not calculated for all registrant information in step S8, the counter x is incremented by one in step S9, and the process returns to step S5. In other words, the processes of steps S5 to S9 are repeated until the registrant information (x) in which the similarity degree is higher than a predetermined threshold value is obtained. If determined that the similarity degree with the feature quantity of the registrant information (x) is higher than a predetermined threshold value in step S7, the process proceeds to step S10.

In step S10, the check determination unit 15 provides the time-series information DB generation unit 25 and the service determination unit 16 that the registrant corresponding to the registrant information (x) is detected. The related information acquiring unit 30 acquires the information of the current time generated by the RTC 33, and provides the same to the time-series information DB generation unit 25.

In step S11, the time-series information DB generation unit 25 updates the time-series information DB 26 based on the face image of the registrant searched as a check result and the time information.

In step S12, the service determination unit 16 reads out the service content set in correspondence with the registrant searched as a check result from the service condition storage portion 16a.

In step S13, the service determination unit 16 controls the vehicle operation control unit 19 according to the read service content, operates the vehicle, and provides the service to the driver and the passenger. In other words, for instance, the vehicle operation control unit 19 operates the position of the seat, the angle of reclining, the extension and compression position of the telescopic steering, and the like to the state set with respect to the registrant. The vehicle operation control unit 19 sets the engine to a state the engine can be started. In this case, the service determination unit 16 controls the display unit 17 and the audio output unit 18, as necessary, to present to the driver that the position of the seat is adjusted, and the engine can be started by image and audio.

In other words, if the registered person is the driver, the registrant is searched by performing a check based on the feature quantity of the face image, and the service set in correspondence with the searched registrant is provided to the driver. The service optimum to the registrant thus can be provided to the registrant registered in advance. The service to be provided is not only the setting of the seat state and the setting on whether to startup the engine, and may be the setting of operation other vehicle operations.

If the similarity degree with the feature quantities of all registrant information is calculated, and determined that the process by all registrant information is finished in step S8, the check determination unit 15 provides to the service determination unit 16 that the registrant is not searched in step S14. The service determination unit 16 controls the display unit 17 and the audio output unit 18 and presents the driver information that the driver is a non-registrant and registration is urged as the service content where the stored registrant does not exist in the service condition storage portion 16a.

In step S15, the information input unit 20 determines whether or not an operation corresponding to the registration process is made, where the process proceeds to step S16 if the registering information necessary for registering as the registrant is input by operating the information input unit 20.

In step S16, the registrant information registering unit 21 collects the information input when the information input unit 20 is operated, the face image provided from the face image extracting unit 12, and the feature quantity provided from the feature quantity extracting unit 13, and registers the same in the registrant information DB 22 in correspondence with the face image, and then the process returns to step S10.

In other words, if determined as not the registrant as a result of the check with all registrants, registration as a new registrant is urged. The registering information and the feature quantity are registered as the registrant information DB 22 in correspondence with the face image if such registration is responded.

If the operation corresponding to the registration is not performed, that is, if determined that there is no intention of registering as a registrant in step S15, a non-registering process corresponding process is executed in step S18.

[Non Registrant Corresponding Process]

The non-registrant corresponding process will be described with reference to the flowchart of FIG. 6.

In step S101, the related information acquiring unit 30 executes various types of related information acquiring processes to acquire the related information.

[Related Information Acquiring Process]

Figure 7:
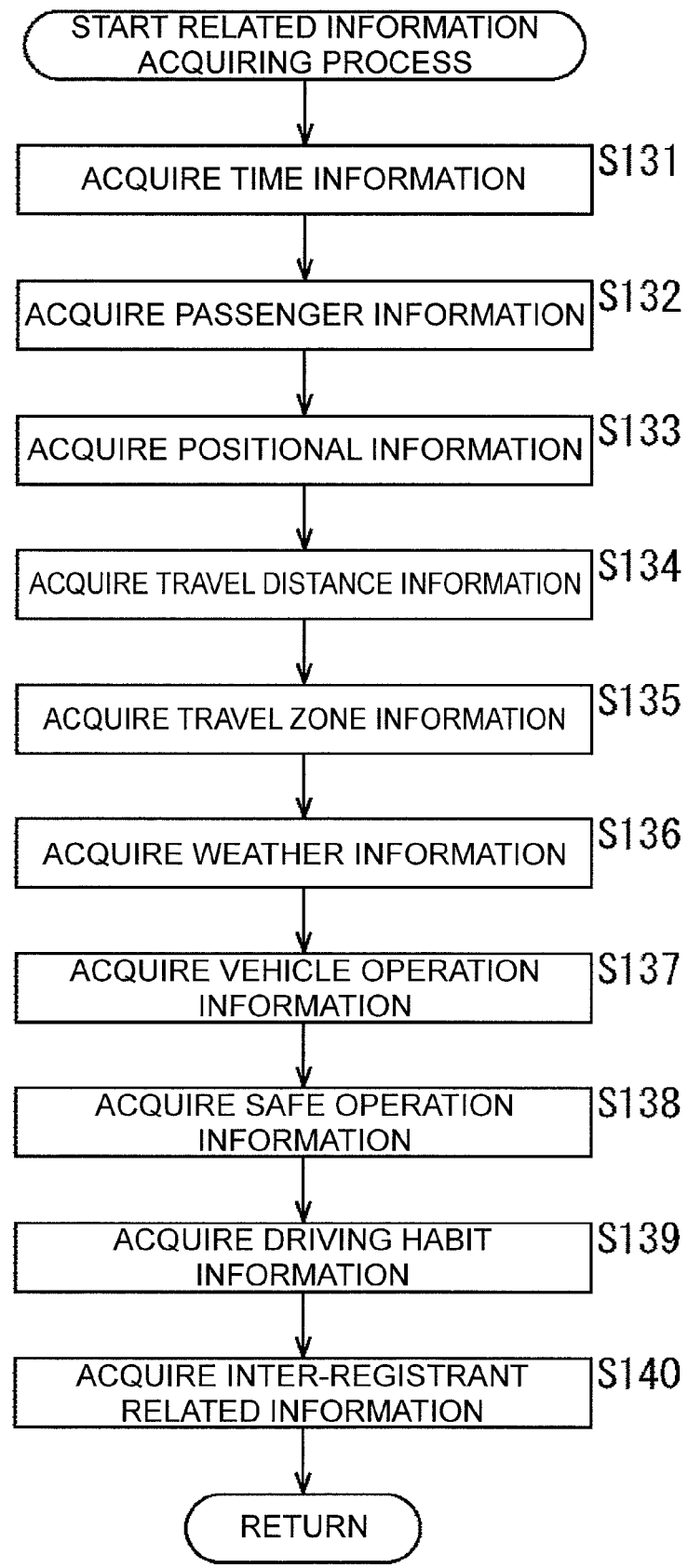
FIG. 7 is a flowchart describing a related information acquiring process.

The related information acquiring process will be described with reference to the flowchart of FIG. 7.

In step S131, the RTC 33 generates time information, and provides the same to the related information acquiring unit 30. The related information acquiring unit 30 provides the acquired time information to the service determination unit 16, the time-series information DB generation unit 25, and the sort processing unit 31.

In step S132, the passenger information acquiring unit 32 acquires the information of the registrant or the non-registrant as the passenger information as a check result of the face image, which is imaged by the passenger imaging unit 11-2 and provided by the check determination unit 15, and provides the same to the related information acquiring unit 30. The related information acquiring unit 30 provides the acquired passenger information to the service determination unit 16, the time-series information DB generation unit 25, and the sort processing unit 31. The recognition process of the face image of the passenger is similar to the process described with reference to the flowchart of FIG. 5, and thus the description will be omitted.

In step S133, the GPS 34 acquires the positional information as the latitude and the longitude on the earth based on the signal from the satellite (not shown), and provides the same to the related information acquiring unit 30. The related information acquiring unit 30 provides the acquired positional information to the service determination unit 16, the time-series information DB generation unit 25, and the sort processing unit 31.

In step S134, the travel distance information acquiring unit 35 acquires the travel information from the travel distance measurement device (not shown), and provides the same to the related information acquiring unit 30. The related information acquiring unit 30 provides the acquired travel information to the service determination unit 16, the time-series information DB generation unit 25, and the sort processing unit 31. The travel distance information is information acquired at the end of driving, and the final information at the timing one traveling is completed becomes the travel distance information.

In step S135, the travel zone information acquiring unit 36 acquires the travel zone information from the navigation device (not shown), and provides the same to the related information acquiring unit 30. The related information acquiring unit 30 provides the acquired travel zone information to the service determination unit 16, the time-series information DB generation unit 25, and the sort processing unit 31. The travel zone information is information acquired at the end of driving, and the final information at the timing one traveling is completed becomes the travel zone information.

In step S136, the weather information acquiring unit 37 acquires the weather information, and provides the same to the related information acquiring unit 30. The related information acquiring unit 30 provides the acquired weather information to the service determination unit 16, the time-series information DB generation unit 25, and the sort processing unit 31.

In step S137, the vehicle operation information acquiring unit 38 acquires the vehicle operation information, and provides the same to the related information acquiring unit 30. The related information acquiring unit 30 provides the acquired vehicle operation information to the service determination unit 16, the time-series information DB generation unit 25, and the sort processing unit 31.

In step S138, the safe operation information acquiring unit 39 acquires the safe operation information, and provides the same to the related information acquiring unit 30. The related information acquiring unit 30 provides the acquired safe operation information to the service determination unit 16, the time-series information DB generation unit 25, and the sort processing unit 31.

In step S139, the driving habit information acquiring unit 40 acquires the driving habit information, and provides the same to the related information acquiring unit 30. The related information acquiring unit 30 provides the acquired driving habit information to the service determination unit 16, the time-series information DB generation unit 25, and the sort processing unit 31.

In step S140, the inter-registrant information acquiring unit 29 acquires the inter-registrant information, and provides the same to the related information acquiring unit 30. The related information acquiring unit 30 provides the acquired inter-registrant information to the service determination unit 16, the time-series information DB generation unit 25, and the sort processing unit 31.

Through the above processes, various types of related information are acquired and provided to the related information acquiring unit 30, and also to the service determination unit 16, the time-series information DB generation unit 25, and the sort processing unit 31.

Figure 6:
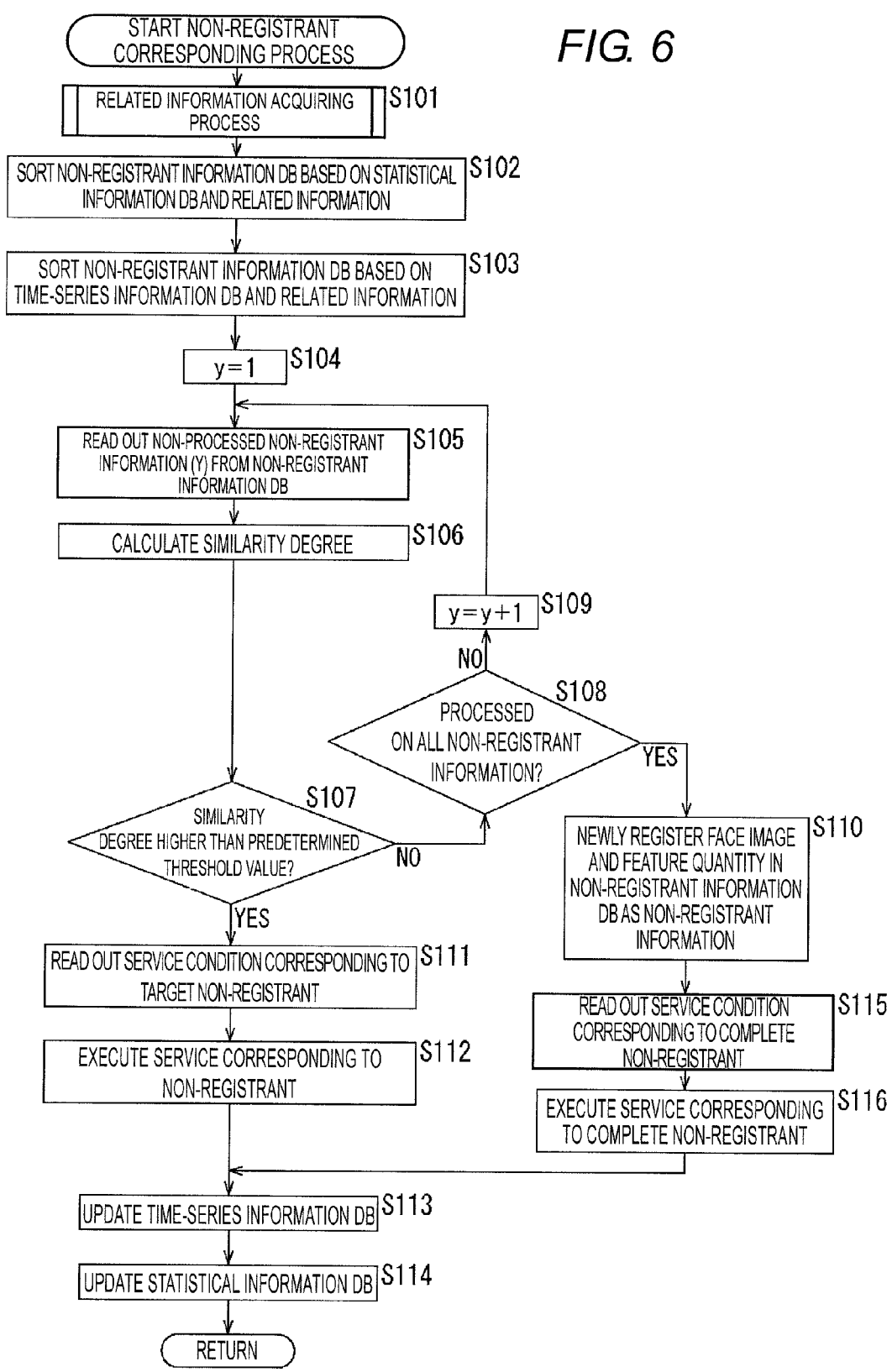
FIG. 6 is a flowchart describing a non-registrant corresponding process.

The description will now return to the flowchart of FIG. 6.

In step S102, the sort processing unit 31 sorts the order of the non-registrant information so that the non-registrant information having a high possibility the check result matches is ranked high of the non-registrants registered in the non-registrant information DB 24 based on the related information provided from the related information acquiring unit 30 and the information of the statistical information DB 28.

In other words, when the related information such as the positional information indicating that the person got on the vehicle at point C, the travel distance information of 1.5 km, and the passenger information of registrant β, and furthermore, the inter-registrant information indicating that the person got on the vehicle after the registrant are acquired through the process of step S101, the sort processing unit 31 sorts the registering order of the non-registrant information so that the non-registrants B, C of the non-registrants A to C including all such related information are ranked high in the case of the statistical information DB 28 shown in FIG. 4. Furthermore, the sort processing unit 31 sorts the registering order of the non-registrant information in the order corresponding to the frequency of the statistical process. Therefore, the corresponding non-registrant information can be rapidly found by sorting to the registering order the non-registrant information having a high possibility the check result matches are ranked high based on the related information and the statistical information DB 28 of the non-registrant information DB 24.

In step S103, the sort processing unit 31 sorts the order of the non-registrant information so that the non-registrant information having a high possibility the check result matches are ranked high of the non-registrants registered in the non-registrant information DB 24 based on the related information provided from the related information acquiring unit 30 and the time-series information DB 26.

In other words, in the case of the statistical information DB 28 shown in FIG. 4, the non-registrant information are registered in the non-registrant information DB 24 such that the non-registrants B, C are ranked high by the process of step S102. In this case, the time-series information that greatly satisfy the related information of positional information indicating that the person got on the vehicle at point C, the travel distance information is 1.5 km, and the passenger information is registrant β, and furthermore, the inter-registrant information indicating that the person got on the vehicle after the registrant are searched. For instance, as shown in FIG. 3, since the non-registrant C satisfies such information, the sort processing unit 31 sorts the registering order of the non-registrant information DB 24 such that the non-registrant C is ranked higher than the non-registrant B. Therefore, the relevant non-registrant information can be rapidly found by sorting the registering order so that the non-registrant information having a high possibility the check result matches is ranked high based on the related information and the time-series information DB 26 of the non-registrant information DB 24.

In other words, the registering order of the non-registrant information DB 24 can be sorted based on the tendency of the related information for each non-registrant and based on the statistical result of the related information in the statistical information DB 28, and the registering order of the non-registrant information DB 24 can be sorted based on the simultaneous occurrence condition and the like of the related information in the time-series information DB 26, and thus the non-registrant information that matches the related information can be rapidly searched by sorting the non-registrant information having a high possibility of matching the related information to be ranked high by the above sorting of the registering order.

In step S104, the similarity degree calculating unit 14 initializes the counter y (not shown) to one.

In step S105, the similarity degree calculating unit 14 reads out the non-registrant information (y) from the non-registrant information DB 24. The non-registrant information (y) is the non-registrant information identified by the counter y indicating the individual registering order of the non-registrant information registered in the non-registrant information DB 24.

In step S106, the similarity degree calculating unit 14 calculates the similarity degree using the feature quantity of the non-registrant information (y) and the feature quantity of the face image provided from the feature quantity extracting unit 13, and provides the same to the check determination unit 15.

In step S107, the check determination unit 15 determines whether or not the similarity degree with the feature quantity of the non-registrant information (y) is higher than a predetermined threshold value, where the process proceeds to step S108 if smaller than the predetermined threshold value, that is, if determined as not similar.

In step S108, whether or not the similarity degree calculating unit 14 calculated the similarity degree for all registrant information registered in the non-registrant information DB 24 is determined. If determined that the similarity degree is not calculated for all registrant information in step S108, the counter y is incremented by 1 in step S109, and the process returns to step S105. In other words, the processes of steps S105 to S109 are repeated until the non-registrant information (y) in which the similarity degree is higher than the predetermined threshold value is obtained. If determined that the similarity degree with the feature quantity of the non-registrant information (y) is higher than the predetermined threshold value in step S107, the process proceeds to step S111.

In step S111, the check determination unit 15 provides the time-series information DB generation unit 25 and the service determination unit 16 that the non-registrant corresponding to the non-registrant information (y) is detected. The service determination unit 16 reads out the service content set in correspondence with the non-registrant searched as a check result and the related information from the service condition storage portion 16a.

In step S112, the service determination unit 16 controls the vehicle operation control unit 19 to operate the vehicle, and provides service to the driver and the passenger according to the read service content. In other words, when determined as the non-registrant C, the vehicle operation control unit 19 assumes that the position of getting on the vehicle is substantially the same, the travel distance is also not long, the registrant β is also riding on the vehicle, and the non-registrant C is a person close to the registrant even in terms of the inter-registrant information and the passenger information from the related information indicating that the non-registrant C got on the vehicle after the registrant, and enables the engine start operation. In this case, the position, the adjustment, and the like of the seat are not registered and thus are not performed. In this case, the service determination unit 16 controls the display unit 17 and the audio output unit 18 to present the driver by image and audio that the position of the seat is not adjusted but the engine can be started up, as necessary.

In step S113, the time-series information DB generation unit 25 updates the time-series information DB 26 based on the related information provided from the related information acquiring unit 30. In other words, the non-registrant registered as the check result at a new time is registered, and the related information is added in correspondence to update the time-series information DB 26.

In step S114, the statistical information DB generation unit 27 performs statistical processing such as cumulative addition or averaging on the related information for each non-registrant of the time-series information DB 26, and updates the statistical information DB 28.

If determined that all non-registrant information are processed in step S108, the process proceeds to step S110.

In step S110, the check determination unit 15 provides to the service determination unit 16 that the person is a complete non-registrant that has not been registered in the non-registrant information DB 24 up to now, and instructs the non-registrant information registering unit 23 to register the non-registrant information as the person is a complete non-registrant. In response to the instruction, the non-registrant information registering unit 23 registers the face image provided from the face image extracting unit 12 and the feature quantity provided from the feature quantity extracting unit 13 in the non-registrant information DB 24 in correspondence with the face image.

In step S115, the service determination unit 16 reads out from the service condition storage portion 16a that the person is a complete non-registrant (complete non-registrant) that has not been searched as the check result, and the service content set in correspondence with the related information.

In step S116, the service determination unit 16 controls the vehicle operation control unit 19 to operate the vehicle, and provides service to the driver and the passenger according to the read service content. In other words, the vehicle operation control unit 19 sets the engine such that startup is disabled when the person is a complete non-registrant, there is no passenger, and the time information indicates late evening. In this case, the service determination unit 16 controls the display unit 17 and the audio output unit 18, and presents that there is robbery, as necessary.

In other words, if the complete non-registrant is a driver, there is no passenger, and the time information indicates late evening, the driver assumes thief of the vehicle and disables the startup of the engine, and also sounds the horn or turns ON the headlight to inform that there is robbery to the vehicle exterior. As a result, when a complete non-registrant is detected based on the face image, robbery is assumed, and a service useful to the owner of the vehicle can be provided.

Therefore, an example in which the engine can be started even if the registration process is not performed when the non-registrant is considered a person close to the registrant from the time-series anteroposterior relationship with the registrant or by the determination on whether the passenger or not has been described, but in a case in which the person is a non-registrant but the registrant has been driving until immediately before, and the non-registrant is detected without the engine being turned OFF and the same non-registrant has been detected over a few times in the past, it is assumed that the driver possibly changed, and the startup of the engine and the operation of the vehicle may be set similar to those for the registrant.

Furthermore, the non-registrant A often travels on route A when riding after the registrant X and often travels on route B when riding after the registrant Y in the related information of the travel zone information according to the time-series information DB 25, and thus the navigation device is set so as to travel on route A when the non-registrant A rides after the registrant X and the navigation device is set so as to travel on route B when the non-registrant A rides after the registrant Y to thereby provide service while distinguishing the response by anteroposterior relationship even with respect to the non-registrant.

In the present embodiment, the process of urging registration is constantly performed when the person is not the registrant, but thief and the like may be imaged when a person who is not the registrant is imaged at late evening and the like, in which case, the related information acquiring process in step S101 is performed to prohibit the registration process itself at the timing after the check process is performed on all registrant information in step S8.

Since the related information such as the travel information cannot be acquired at the time of getting on the vehicle in the related information acquiring process of step S101, the related information to acquire may be changed for every event such as when getting on the vehicle, when starting the vehicle, while traveling, when stopping, and when getting off the vehicle.

In the example described above, description has been made to individually manage various types of databases, but the databases do not necessarily need to be configured as an individual database, and a database that uniform manages all data may be configured, and only the necessary information may be extracted and sorted to secondarily configure a plurality of databases from one database.

The series of monitoring processes described above may be executed by hardware, but may also be executed by software. When executing the series of processes by software, the program configuring the software may be installed from a recording medium to a computer incorporated in a dedicated hardware, or a general-purpose personal computer capable of executing various types of functions by installing various types of programs.

Figure 8:
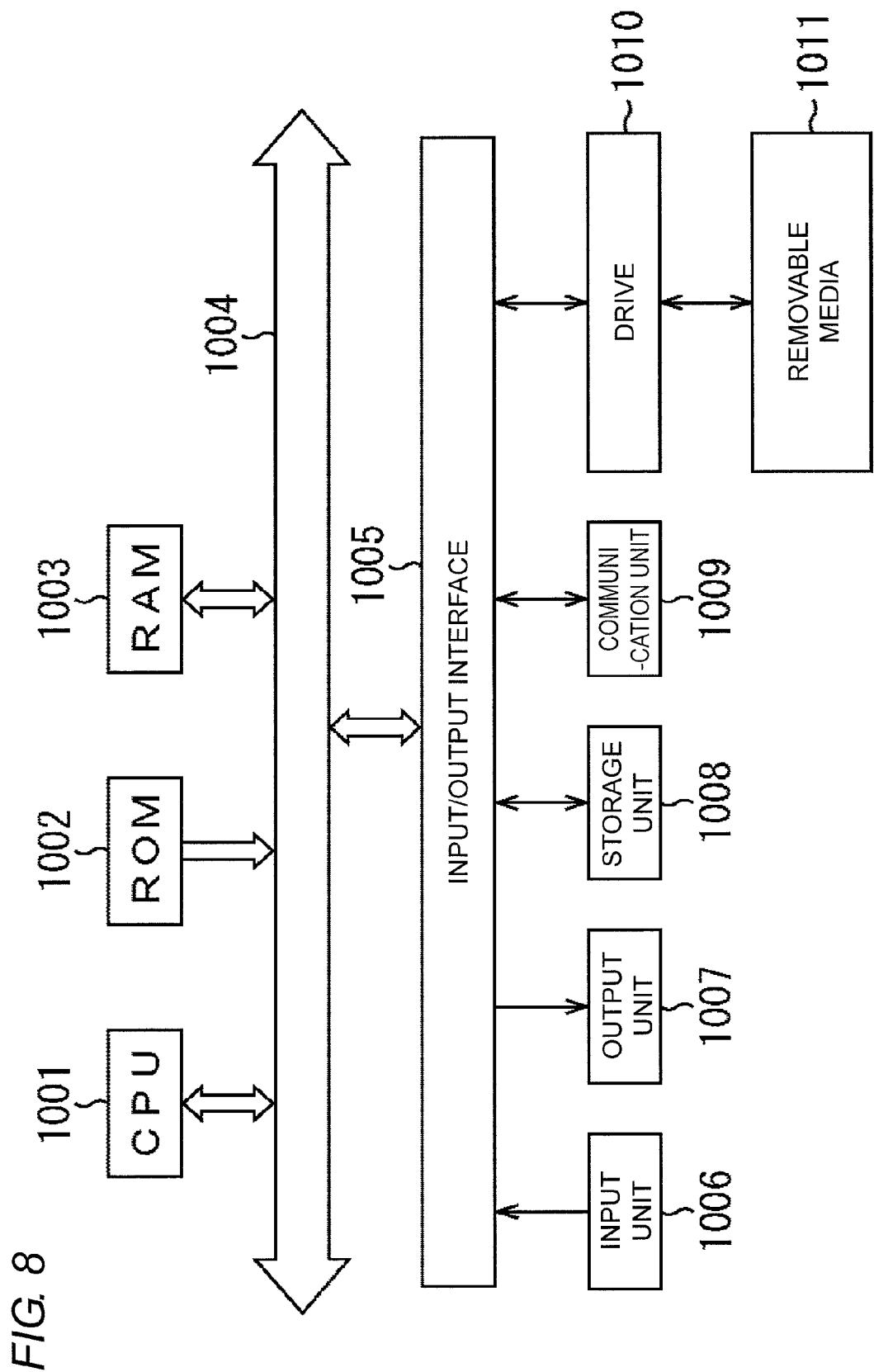
FIG. 8 is a view showing a configuration example of a general-purpose computer.

FIG. 8 shows a configuration example of the general-purpose personal computer. The personal computer incorporates a CPU (Central Processing Unit) 1001. An input/output interface 1005 is connected to the CPU 1001 through a bus 1004. A ROM (Read Only Memory) 1002 and a RAM (Random Access Memory) 1003 are connected to the bus 1004.

The input/output interface 1005 includes an input unit 1006 including an input device such as a keyboard and a mouse with which the user inputs operation commands, an output unit 1007 for outputting the processing operation screen and the image of the processing result to the display device, a storage unit 1008 including a hard disc drive for storing programs and various types of data, and a LAN (Local Area Network) adapter, and is connected with a communication unit 1009 for executing the communication process through the network represented by the Internet. A drive 1010 for reading and writing data with respect to a removable media 1011 such as a magnetic disc (include flexible disc), an optical disc (include CD-ROM (Compact Disc-Read Only Memory), DVD (Digital Versatile Disc)), a magnetic optical disc (include MD (Mini Disc)), or a semiconductor memory.

The CPU 1001 executes various types of processes according to the program stored in the ROM 1002, or the program read out from the removable disc 1011 such as the magnetic disc, the optical disc, the magnetic optical disc, the semiconductor memory or the like, installed in the storage unit 1008, and loaded from the storage unit 1008 to the RAM 1003. The data necessary for the CPU 1001 to execute various types of processes are also appropriately stored in the RAM 1003.

In the present specification, the steps describing the program recorded in the recording medium include the processes performed in time-series along the described order, but the processes may not necessarily be processed in time-series, and may also include processes executed in parallel or individually.

In the specification, the system represents the entire apparatus configured by a plurality of devices.

In accordance with one aspect of the present invention, there is provided a vehicle operation control device including: an imaging unit for imaging an image of a checking target; a face image extracting unit for extracting a face image of the checking target from an image imaged by the imaging unit; a feature quantity extracting unit for extracting a feature quantity of the face image of the checking target extracted by the face image extracting unit; a registrant storage unit for storing the feature quantity of the face image of a registrant as a registrant information database; a non-registrant storage unit for storing the feature quantity of the face image of a non-registrant; a similarity degree calculating unit for calculating a similarity degree of the feature quantity of the face image of the checking target extracted by the feature quantity extracting unit and the feature quantity of the face image of the registrant stored in the registrant information database or the non-registrant stored in the non-registrant storage unit; a searching unit for checking the similarity degree and a predetermined threshold value in the order stored in the registrant information database or the non-registrant storage unit, searching the registrant having a higher similarity degree than the predetermined threshold value as the checking target, and searching the non-registrant having a higher similarity degree than the predetermined threshold value as the checking target if the registrant having higher similarity degree than the predetermined threshold value does not exist; a related information detecting unit for detecting information indicating a relationship with the registrant of the non-registrant searched as the checking target; an operation control unit for controlling a vehicle operation state to a state set in advance in correspondence with the registrant or a state set in advance in correspondence with the information indicating the relationship with the registrant of the non-registrant when the registrant or the non-registrant is searched by the searching unit; a statistical information database updating unit for updating, as a statistical information database, a statistical processing result of the information indicating the relationship with the registrant for every non-registrant with respect to the information indicating the relationship with the registrant in correspondence with the registrant or the non-registrant when the vehicle operation state is controlled by the operation control unit; and a sorting unit for sorting a storing order of the non-registrant stored in the non-registrant storage unit in correspondence with the statistical processing result of the information indicating the relationship with the registrant for every non-registrant registered in the statistical information database; wherein the searching unit checks the similarity degree and the predetermined threshold value for the non-registrant stored in the non-registrant storage unit in the storing order sorted by the sorting unit, and searches the non-registrant having a higher similarity degree than the predetermined threshold value.

The non-registrant storage unit stores the feature quantity of the face image of the non-registrant as a non-registrant information database; the similarity degree calculation unit calculates the similarity degree of the feature quantity of the face image of the checking target extracted by the feature quantity extracting unit, and the feature quantity of the face image of the registrant stored in the registrant information database or the non-registrant stored in the non-registrant information database; the related information detecting unit detects information indicating time-series anteroposterior relationship with the registrant of the non-registrant searched as the checking target; the operation control unit controls the vehicle operation state to a state set in advance in correspondence with the registrant or to a state set in advance in correspondence with the information indicating the time-series anteroposterior relationship with the registrant of the non-registrant when the registrant or the non-registrant is searched by the searching unit; a time-series information database updating unit for updating the information indicating the time-series anteroposterior relationship with the registrant as a time-series information database in correspondence with the face image of the registrant or the non-registrant when the vehicle operation is controlled by the operation control unit is further arranged; the statistical information database updating unit updates the statistical processing result of the information indicating the time-series anteroposterior relationship with the registrant for every non-registrant with respect to the information of the time-series information database; the sorting unit sorts the storing order of the non-registrant of the non-registrant database in correspondence with the statistical processing result of the information indicating the anteroposterior relationship with the registrant for every non-registrant registered in the statistical information database; and the searching unit checks the similarity degree and the predetermined threshold value for the non-registrant stored in the non-registrant information database in the storing order sorted by the sorting unit, and searches the non-registrant having a higher similarity degree than the predetermined threshold value as the checking target.

A related information acquiring unit for acquiring related information when the vehicle operation state is controlled by the operation control unit is further arranged; the time-series information database updating unit updates information indicating time-series anteroposterior relationship and the related information as a time-series information database in correspondence with the face image of the registrant or the non-registrant when the vehicle operation is controlled by the operation control unit; the statistical information database updating unit updates the statistical processing result of the time-series anteroposterior relationship with the registrant and the related information for every non-registrant with respect to the information of the time-series information database; the related information detecting unit detects the time-series anteroposterior relationship with the registrant and the related information of the non-registrant searched as the checking target in the time-series information database; and the sorting unit sorts the storing order of the non-registrant of the non-registrant database in correspondence with the statistical processing result of the information indicating the time-series anteroposterior relationship with the registrant and the related information for every non-registrant registered in the statistical information database.

The related information includes facial attribute information containing information of age, sex, race, accessories such as eyeglass, makeup, and cigarette, as well as, time, passenger, position, travel distance, travel zone, weather information, vehicle operation, safety device operation, or driving habit information.

In accordance with another aspect of the present invention, there is provided a vehicle operation control method including the steps of: imaging an image of a checking target; extracting a face image of the checking target from an image imaged by the process of the imaging step; extracting a feature quantity of the face image of the checking target extracted by the process of the face image extracting step; storing the feature quantity of the face image of a registrant as a registrant information database; storing the feature quantity of the face image of a non-registrant; calculating a similarity degree of the feature quantity of the face image of the checking target extracted by the process of the feature quantity extracting step and the feature quantity of the face image of the registrant stored in the registrant information database or the non-registrant stored in the process of the non-registrant storing step; checking the similarity degree and a predetermined threshold value in the order stored in the registrant information database or by the process of the non-registrant storing step, searching the registrant having a higher similarity degree than the predetermined threshold value as the checking target, and searching the non-registrant having a higher similarity degree than a higher similarity degree than the predetermined threshold value as the checking target if the registrant having a higher similarity degree than the predetermined threshold value does not exist; detecting information indicating a relationship with the registrant of the non-registrant searched as the checking target; controlling a vehicle operation state to a state set in advance in correspondence with the registrant or a state set in advance in correspondence with the information indicating the relationship with the registrant of the non-registrant when the registrant or the non-registrant is searched by the process of the searching step; updating, as a statistical information database, statistical processing result of the information indicating the relationship with the registrant for every non-registrant with respect to the information indicating the relationship with the registrant in correspondence with the registrant or the non-registrant when the vehicle operation state is controlled by the process of the operation control step; and sorting a storing order of the non-registrant stored by the process of the non-registrant storing step in correspondence with the statistical processing result of the information indicating the relationship with the registrant for every non-registrant registered in the statistical information database; wherein the process of the searching step includes checking the similarity degree and the predetermined threshold value for the non-registrant stored by the process of the non-registrant storing step in the storing order sorted by the process of the sorting step, and searching the non-registrant having a higher similarity degree than the predetermined threshold value.

In accordance with still another aspect of the present invention, there is provided a program causing a computer controlling a vehicle operation control device to execute the steps of: imaging an image of a checking target; extracting a face image of the checking target from an image imaged by the process of the imaging step; extracting a feature quantity of the face image of the checking target extracted by the process of the face image extracting step; storing the feature quantity of the face image of a registrant as a registrant information database; storing the feature quantity of the face image of a non-registrant; calculating a similarity degree of the feature quantity of the face image of the checking target extracted by the process of the feature quantity extracting step and the feature quantity of the face image of the registrant stored in the registrant information database or the non-registrant stored in the process of the non-registrant storing step; checking the similarity degree and a predetermined threshold value in the order stored in the registrant information database or by the process of the non-registrant storing step, searching the registrant having a higher similarity degree than the predetermined threshold value as the checking target, and searching the non-registrant having a higher similarity degree than the predetermined threshold value as the checking target if the registrant having a higher similarity degree than the predetermined threshold value does not exist; detecting information indicating a relationship with the registrant of the non-registrant searched as the checking target; controlling a vehicle operation state to a state set in advance in correspondence with the registrant or a state set in advance in correspondence with the information indicating the relationship with the registrant of the non-registrant when the registrant or the non-registrant is searched by the process of the searching step; updating, as a statistical information database, statistical processing result of the information indicating the relationship with the registrant for every non-registrant with respect to the information indicating the relationship with the registrant in correspondence with the registrant or the non-registrant when the vehicle operation state is controlled by the process of the operation control step; and sorting a storing order of the non-registrant stored by the process of the non-registrant storing step in correspondence with the statistical processing result of the information indicating the relationship with the registrant for every non-registrant registered in the statistical information database; wherein the process of the searching step includes checking the similarity degree and the predetermined threshold value for the non-registrant stored by the process of the non-registrant storing step in the storing order sorted by the process of the sorting step, and searching the non-registrant having a higher similarity degree than the predetermined threshold value.

In the vehicle operation control device of one aspect of the present invention, the imaging unit for imaging an image of a checking target is an imaging unit for imaging a driver and a passenger mounted on a vehicle; the face image extracting unit for extracting a face image of the checking target from the image imaged by the imaging unit is a face image extracting unit for extracting a face image from the image imaged by the imaging unit; the feature quantity extracting unit for extracting a feature quantity of the face image of the checking target extracted by the face image extracting unit is a feature quantity extracting unit for extracting a feature quantity from the face image extracted by the face image extracting unit; the registrant storage unit for storing the feature quantity of the face image of a registrant as a registrant information database is a registrant database including information of the face image and the feature quantity of the registrant; the non-registrant storage unit for storing the feature quantity of the face image of a non-registrant is a non-registrant information database including information of the face image and the feature quantity of the non-registrant; the similarity degree calculating unit for calculating a similarity degree of the feature quantity of the face image of the checking target extracted by the feature quantity extracting unit and the feature quantity of the face image of the registrant stored in the registrant information database or the non-registrant stored in the non-registrant storage unit is a similarity degree calculating unit for calculating a similarity degree of the feature quantity of the face image of the checking target and the feature quantity of the face image of the registrant stored in the registrant information database or the non-registrant stored in the non-registrant information database; the searching unit for checking the similarity degree and a predetermined threshold value in the order stored in the registrant information database or the non-registrant storage unit, searching the registrant having a higher similarity degree than the predetermined threshold value as the checking target, and searching the non-registrant having a higher similarity degree than the predetermined threshold value as the checking target if the registrant having a higher similarity degree than the predetermined threshold value does not exist is a check determination unit for searching the registrant or the non-registrant having a high similarity degree by comparing the respective similarity degree with a predetermined threshold value; a related information detecting unit for detecting information indicating a relationship with the registrant of the non-registrant searched as the checking target is an inter-registrant information acquiring unit for detecting an anteroposterior relationship with the registrant for every non-registrant in time-series based on the information of the time-series information database; the operation control unit for controlling a vehicle operation state to a state set in advance in correspondence with the registrant or a state set in advance in correspondence with the information indicating the relationship with the registrant of the non-registrant when the registrant or the non-registrant is searched by the searching unit is a vehicle operation control unit for controlling various types of operations of the vehicle; the statistical information database updating unit for updating, as a statistical information database, a statistical processing result of the information indicating the relationship with the registrant for every non-registrant with respect to the information indicating the relationship with the registrant in correspondence with the registrant or the non-registrant when the vehicle operation state is controlled by the operation control unit is a statistical information database generation unit; and the sorting unit for sorting a storing order of the non-registrant stored in the non-registrant storage unit in correspondence with the statistical processing result of the information indicating the relationship with the registrant for every non-registrant registered in the statistical information database is a sort processing unit; where the check determination unit as the searching unit checks the similarity degree and the predetermined threshold value for the non-registrant stored in the non-registrant storage unit as the non-registrant database in the storing order sorted by the sorting unit as the sort processing unit, and searches the non-registrant having a higher similarity degree than the predetermined threshold value.

In other words, the check determination unit searches for the non-registrant having a higher similarity degree than the predetermined threshold value by checking the similarity degree and the predetermined threshold value for the non-registrant of the non-registrant database in the storing order sorted by the sort processing unit.

Thus, sorting can be carried out such that the non-registrant corresponding to the statistical processing result of the information indicating the relationship with the registrant detected by the related information detecting unit, of the information indicating the relationship with the registrant for every non-registrant, registered in the statistical information database of the non-registrant database is ranked high, and hence the search process can be realized efficiently and at high speed, and the vehicle operation state can be controlled to a state set in correspondence with the information indicating the relationship with the registrant with respect to the searched non-registrant.

As a result, the vehicle operation state can be controlled to different states even for the non-registrants in correspondence with the information indicating the relationship with the registrant. Thus, a setting is such that the regulation when driving the vehicle is widely lifted for a person having a high frequency of sitting at the driver seat next to the registrant assuming that such a person is relatively close to the registrant although the person is a non-registrant. In contrast, only the regulation minimum required for driving is lifted for a person who sits at the driver seat irrespective of the timing the registrant got on the vehicle and at not as high frequency since the possibility the person is not very close to the registrant is high. Furthermore, the operation can be regulated to an extent even where the engine cannot be started if the person is a non-registrant who sat at the driver seat for the first time, and hence an optimum response can be individually made even for non-registrants in the recognition process of the passenger of the automobile.

According to the present invention, an optimum response can be individually made even for non-registrants in the recognition process of the passenger of the automobile.

What is claimed is:

1. A vehicle operation control device comprising:
   an imaging unit for imaging an image of a checking target;
   a face image extracting unit for extracting a face image of the checking target from an image imaged by the imaging unit;
   a feature quantity extracting unit for extracting a feature quantity of the face image of the checking target extracted by the face image extracting unit;
   a registrant storage unit for storing the feature quantity of the face image of a registrant as a registrant information database;
   a non-registrant storage unit for storing the feature quantity of the face image of a non-registrant;
   a similarity degree calculating unit for calculating a similarity degree of the feature quantity of the face image of the checking target extracted by the feature quantity extracting unit and the feature quantity of the face image of the registrant stored in the registrant information database or the non-registrant stored in the non-registrant storage unit;
   a searching unit for checking the similarity degree and a predetermined threshold value in the order stored in the registrant information database or the non-registrant storage unit, searching the registrant having a higher similarity degree than the predetermined threshold value as the checking target, and searching the non-registrant having a higher similarity degree than the predetermined threshold value as the checking target if the registrant having higher similarity degree than the predetermined threshold value does not exist;
   a related information detecting unit for detecting information indicating a relationship with the registrant of the non-registrant searched as the checking target;
   an operation control unit for controlling a vehicle operation state to a state set in advance in correspondence with the registrant or a state set in advance in correspondence with the information indicating the relationship with the registrant of the non-registrant when the registrant or the non-registrant is searched by the searching unit;
   a statistical information database updating unit for updating, as a statistical information database, a statistical processing result of the information indicating the relationship with the registrant for every non-registrant with respect to the information indicating the relationship with the registrant in correspondence with the registrant or the non-registrant when the vehicle operation state is controlled by the operation control unit; and
   a sorting unit for sorting a storing order of the non-registrant stored in the non-registrant storage unit in correspondence with the statistical processing result of the information indicating the relationship with the registrant for every non-registrant registered in the statistical information database; wherein the searching unit checks the similarity degree and the predetermined threshold value for the non-registrant stored in the non-registrant storage unit in the storing order sorted by the sorting unit, and searches the non-registrant having a higher similarity degree than the predetermined threshold value.

2. The vehicle operation control device according to claim 1, wherein the non-registrant storage unit stores the feature quantity of the face image of the non-registrant as a non-registrant information database;

the similarity degree calculation unit calculates the similarity degree of the feature quantity of the face image of the checking target extracted by the feature quantity extracting unit, and the feature quantity of the face image of the registrant stored in the registrant information database or the non-registrant stored in the non-registrant information database;

the related information detecting unit detects information indicating time-series anteroposterior relationship with the registrant of the non-registrant searched as the checking target;

the operation control unit controls the vehicle operation state to a state set in advance in correspondence with the registrant or to a state set in advance in correspondence with the information indicating the time-series anteroposterior relationship with the registrant of the non-registrant when the registrant or the non-registrant is searched by the searching unit;

a time-series information database updating unit for updating the information indicating the time-series anteroposterior relationship with the registrant as a time-series information database in correspondence with the face image of the registrant or the non-registrant when the vehicle operation is controlled by the operation control unit is further arranged;

the statistical information database updating unit updates the statistical processing result of the information indicating the time-series anteroposterior relationship with the registrant for every non-registrant with respect to the information of the time-series information database;

the sorting unit sorts the storing order of the non-registrant of the non-registrant database in correspondence with the statistical processing result of the information indicating the anteroposterior relationship with the registrant for every non-registrant registered in the statistical information database; and the searching unit checks the similarity degree and the predetermined threshold value for the non-registrant stored in the non-registrant information database in the storing order sorted by the sorting unit, and searches the non-registrant having a higher similarity degree than the predetermined threshold value as the checking target.

3. The vehicle operation control device according to claim 1, further comprising:

a related information acquiring unit for acquiring related information when the vehicle operation state is controlled by the operation control unit; wherein the time-series information database updating unit updates information indicating time-series anteroposterior relationship and the related information as a time-series information database in correspondence with the face image of the registrant or the non-registrant when the vehicle operation is controlled by the operation control unit;

the statistical information database updating unit updates the statistical processing result of the time-series anteroposterior relationship with the registrant and the related information for every non-registrant with respect to the information of the time-series information database;

the related information detecting unit detects the time-series anteroposterior relationship with the registrant and the related information of the non-registrant searched as the checking target in the time-series information database; and the sorting unit sorts the storing order of the non-registrant of the non-registrant database in correspondence with the statistical processing result of the information indicating the time-series anteroposterior relationship with the registrant and the related information for every non-registrant registered in the statistical information database.

4. The vehicle operation control device according to claim 1, wherein the related information includes facial attribute information containing information of age, sex, race, accessories such as eyeglass, makeup, and cigarette, as well as, time, passenger, position, travel distance, travel zone, weather information, vehicle operation, safety device operation, or driving habit information.

5. A vehicle operation control method comprising the steps of:

imaging an image of a checking target;

extracting a face image of the checking target from an image imaged by the process of the imaging step;

extracting a feature quantity of the face image of the checking target extracted by the process of the face image extracting step;

storing the feature quantity of the face image of a registrant as a registrant information database;

storing the feature quantity of the face image of a non-registrant;

calculating a similarity degree of the feature quantity of the face image of the checking target extracted by the process of the feature quantity extracting step and the feature quantity of the face image of the registrant stored in the registrant information database or the non-registrant stored in the process of the non-registrant storing step;

checking the similarity degree and a predetermined threshold value in the order stored in the registrant information database or by the process of the non-registrant storing step, searching the registrant having a higher similarity degree than the predetermined threshold value as the checking target, and searching the non-registrant having a higher similarity degree than the predetermined threshold value as the checking target if the registrant having a higher similarity degree than the predetermined threshold value does not exist;

detecting information indicating a relationship with the registrant of the non-registrant searched as the checking target;

controlling a vehicle operation state to a state set in advance in correspondence with the registrant or a state set in advance in correspondence with the information indicating the relationship with the registrant of the non-registrant when the registrant or the non-registrant is searched by the process of the searching step;

updating, as a statistical information database, statistical processing result of the information indicating the relationship with the registrant for every non-registrant with respect to the information indicating the relationship with the registrant in correspondence with the registrant or the non-registrant when the vehicle operation state is controlled by the process of the operation control step; and sorting a storing order of the non-registrant stored by the process of the non-registrant storing step in correspondence with the statistical processing result of the information indicating the relationship with the registrant for every non-registrant registered in the statistical information database; wherein the process of the searching step includes checking the similarity degree and the predetermined threshold value for the non-registrant stored by the process of the non-registrant storing step in the storing order sorted by the process of the sorting step, and searching the non-registrant having a higher similarity degree than the predetermined threshold value.

6. A non-transitory computer-readable medium storing a program for causing a computer controlling a vehicle operation control device to execute the steps of: imaging an image of a checking target; extracting a face image of the checking target from an image imaged by the process of the imaging step; extracting a feature quantity of the face image of the checking target extracted by the process of the face image extracting step; storing the feature quantity of the face image of a registrant as a registrant information database; storing the feature quantity of the face image of a non-registrant; calculating a similarity degree of the feature quantity of the face image of the checking target extracted by the process of the feature quantity extracting step and the feature quantity of the face image of the registrant stored in the registrant information database or the non-registrant stored in the process of the non-registrant storing step; checking the similarity degree and a predetermined threshold value in the order stored in the registrant information database or by the process of the non-registrant storing step, searching the registrant having a higher similarity degree than the predetermined threshold value as the checking target, and searching the non-registrant having a higher similarity degree than the predetermined threshold value as the checking target if the registrant having a higher similarity degree than the predetermined threshold value does not exist; detecting information indicating a relationship with the registrant of the non-registrant searched as the checking target; controlling a vehicle operation state to a state set in advance in correspondence with the registrant or a state set in advance in correspondence with the information indicating the relationship with the registrant of the non-registrant when the registrant or the non-registrant is searched by the process of the searching step; updating, as a statistical information database, statistical processing result of the information indicating the relationship with the registrant for every non-registrant with respect to the information indicating the relationship with the registrant in correspondence with the registrant or the non-registrant when the vehicle operation state is controlled by the process of the operation control step; and sorting a storing order of the non-registrant stored by the process of the non-registrant storing step in correspondence with the statistical processing result of the information indicating the relationship with the registrant for every non-registrant registered in the statistical information database; wherein the process of the searching step includes checking the similarity degree and the predetermined threshold value for the non-registrant stored by the process of the non-registrant storing step in the storing order sorted by the process of the sorting step, and searching the non-registrant having a higher similarity degree than the predetermined threshold value.

* * * * *